United States Patent [19]
Kitahara et al.

[11] 4,412,041
[45] Oct. 25, 1983

[54] PROCESS FOR MODIFYING RUBBERS EMPLOYING A COMPOUND CONTAINING A CARBOXYL AND AN ALDEHYDE GROUP

[75] Inventors: Shizuo Kitahara, Kawaguchi; Yoshitsugu Hirokawa, Yokohama; Haruki Kawada, Yokohama; Toshihiro Fujii, Yokohama; Nagatoshi Sugi, Yokohama; Hiroaki Hasegawa, Yokohama; Akira Yoshioka, Kamakura, all of Japan

[73] Assignee: Nippon Zeon Co. Ltd., Tokyo, Japan

[21] Appl. No.: 467,765

[22] Filed: Feb. 18, 1983

[30] Foreign Application Priority Data

Feb. 19, 1982 [JP] Japan .................. 57-25476

[51] Int. Cl.$^3$ ............................... C08F 8/28
[52] U.S. Cl. .................... 525/154; 525/262; 525/301; 260/756; 260/762
[58] Field of Search .............. 525/154, 262, 301; 260/756, 762

[56] References Cited

U.S. PATENT DOCUMENTS

| | | | |
|---|---|---|---|
| 3,236,917 | 2/1966 | Natta et al. | 525/301 |
| 3,301,822 | 1/1967 | Dalibor | 525/154 |
| 3,519,627 | 7/1970 | Coats et al. | 528/254 |
| 3,597,313 | 8/1971 | Williams et al. | 525/61 |
| 3,853,801 | 12/1974 | Tominaga et al. | 525/301 |
| 3,872,000 | 3/1975 | Hamada et al. | 528/230 |
| 4,005,053 | 1/1977 | Briggs et al. | 524/533 |
| 4,032,629 | 6/1977 | Osberghaus | 424/73 |
| 4,097,551 | 6/1978 | DiGiulio et al. | 525/301 |
| 4,100,137 | 7/1978 | Lemieux et al. | 525/154 |
| 4,326,576 | 4/1982 | Mizumoto et al. | 524/511 |

FOREIGN PATENT DOCUMENTS

| | | | |
|---|---|---|---|
| 57-55902 | 4/1982 | Japan | 525/154 |
| 787419 | 12/1980 | U.S.S.R. | 525/154 |

OTHER PUBLICATIONS

Derwent Abst. 12761 V/07 (2-1974) (NL 7310573).
Derwent Abst. 32886 c/19 (4-1980) (DT2845569).

*Primary Examiner*—John C. Bleutge
*Assistant Examiner*—Herbert J. Lilling
*Attorney, Agent, or Firm*—Sherman & Shalloway

[57] ABSTRACT

A process for modifying a rubber, which comprises reacting a rubber having an unsaturated carbon linkage with an organic compound having a carboxyl group and an aldehyde group in the presence of an acid catalyst.

15 Claims, No Drawings

PROCESS FOR MODIFYING RUBBERS EMPLOYING A COMPOUND CONTAINING A CARBOXYL AND AN ALDEHYDE GROUP

This invention relates to a process for modifying a rubber having an unsaturated carbon linkage.

Methods have previously been known to introduce a polar group such as a carboxyl group into rubber by, for example, performing addition-reaction of maleic anhydride, glyoxal, etc. with rubber in order to improve the properties of rubber in the unvulcanized and vulcanized states, such as green strength and adhesion. Many of them, however, have the defect that because side-reactions such as the gellation of rubber or a reduction in its molecular weight tends to take place incident to the addition-reaction, a vulcanizate of the rubber has reduced strength properties, or the rate of reaction is low.

It is an object of this invention to develop a process for modifying rubber, which is free from this defect.

According to this invention, this object is achieved by a process for modifying a rubber, which comprises reacting a rubber having an unsaturated carbon linkage with an organic compound having a carboxyl group and an aldehyde group in the presence of an acid catalyst.

Examples of the rubber having an unsaturated carbon linkage (to be sometimes referred to as an unsaturated rubber or simply a rubber hereinafter) used in the present invention include homopolymers of conjugated dienes such as butadiene, isoprene, piperylene, 2,3-dimethylbutadiene and chloroprene, copolymers of two or more of these conjugated dienes, copolymers of these conjugated dienes with other monomers, ring-opened polymers of cycloolefins such as cyclopentane and norbornene, polymers of dienes such as ethylidene norbornene and cyclopentadiene, and polyolefin rubbers such as copolymers of the aforesaid dienes and olefins. Typical examples include natural rubber (hevea), guayule rubber, synthetic polyisoprene rubbers, polybutadiene rubber, a styrene-butadiene copolymer rubber, a butadiene-isoprene copolymer rubber, an isoprene-styrene copolymer rubber, a butadiene-isoprene-styrene copolymer rubber, a butadiene-piperylene copolymer rubber, a butadiene-propylene alternate copolymer rubber, polypentenamer, an ethylene-propylene-diene copolymer rubber, butyl rubber, a butadiene-acrylonitrile copolymer rubber, a butadiene-isoprene-acrylonitrile copolymer rubber, polychloroprene rubber, a styrene-butadiene-styrene block copolymer rubber, and a styrene-sioprene-styrene block copolymer rubber. The rate of reaction is generally high when a homopolymer or copolymer of isoprene, a homopolymer or copolymer of piperylene and an ethylene-propylene-diene copolymer rubber are used.

The organic compound containing a carboxyl group and an aldehyde group used in this invention is a compound containing at least one of each of these groups, and includes linear aliphatic compounds having up to about 20 carbon atoms, aromatic compounds having such rings as a benzene, naphthalene, pyridine or furane ring, and an alicyclic compound having such a ring as a cyclopentane, cyclopentene or cyclohexane ring. These compounds may, as desired, contain an oxygen atom, a sulfur atom, a nitrogen atom, or a multiple bond in the molecular chains. Alternatively, the hydrogen atom in the molecule may, as desired, be substituted by a halogen atom, an alkyl group, an alkoxy group, an acyl group, a hydroxyl group, a nitrile group, an amino group, etc. if the substitution does not adversely affect the reaction.

More specifically, the aliphatic compounds include glyoxylic acid, formylacetic acid, 2-formylacrylic acid, 6-formylhexanoic acid, 8-formyloctanoic acid, formylmethoxyacetic acid, 2-formylethylacetic acid, and 3-(carbomethoxy)propionaldehyde. The aromatic compounds include 2-, 3- or 4-carboxybenzaldehyde, 2-formyl-5-acetyl-benzoic acid, 2-, 3- or 4-formylphenylacetic acid, 2-formyl-5-hydroxyphenylacetic acid, 3-(2-formylphenyl)propionic acid, 2-formylcinnamic acid, 1,8-naphthaldehyde acid, 2-, 3- or 4-formylphenoxyacetic acid, 2-formyl-4-methylphenoxyacetic acid, 2-(2-formylphenoxy)propionic acid, 3-(2-formylphenoxy)-propionic acid, 2-formyl-1-phenoxyisovaleric acid, 6-(2-, 3- or 4-formylphenoxy)hexanoic acid, (2-formylphenyl)methoxyacetic acid, 2-, 3- or 4-formylphenylthioacetic acid, (1-formyl-2-naphthyloxy)acetic acid, [(5-formyl-2-furyl)thio]acetic acid, (8-formyl-2-oxo-2H-1-benzopyran-7-yl-oxy)acetic acid, 2-, 3- or 4-carboxyphenoxyacetaldehyde, and 2-(formylmethoxy)phenoxyacetic acid. The alicyclic compounds include 2- or 3-formylcyclopentanecarboxylic acid, 4-formyl-2-cyclopentenecarboxylic acid and 2-formylcyclohexanecarboxylic acid.

Among these organic compounds, those having such a structure that the carboxyl group and the aldehyde group therein are easy of three-dimensionally or thermodynamically approaching each other moderately in the molecule through an acid catalyst, particularly compounds having an aromatic ring in which the carboxyl group or an atomic grouping containing this group and the aldehyde group or an atomic grouping containing this group are located adjacent to each other on the ring (at the ortho-position when the ring is a benzene ring), are especially preferred in this invention because they lead to a high rate of reaction.

When 2-formylphenoxyacetic acid, 3-(2-formylphenoxy)propionic acid, etc. which are compounds exhibiting a high rate of addition reaction with the unsaturated linkage of the rubber, are mixed with tin tetrachloride, the formation of a red color (having a visible light absorption at approximately 510 nm) presumably owing to the coordination of the carbonyl group with tin tetrachloride is observed. Infrared absorption spectrum analysis leads to the observation that the C=O stretching vibration of the aldehyde group and the carboxyl group is shifted to a lower wavelength owing to the presence of tin tetrachloride. From these facts, it is presumed that in the process of this invention, the rate of addition reaction is increased by the coordination of a tin tetrachloride catalyst with both of the carboxyl group and the aldehyde group.

Furthermore, those organic compounds having a carboxyl and an aldehyde group which contain a large amount of a non-polar or a relatively weakly polar hydrocarbon moiety, or those which have a low melting point are suitable for the reaction operation because they have a high solubility in hydrocarbon solvents.

The amount of the organic compound having a carboxyl and an aldehyde group is not particularly restricted. Usually, it is 0.01 to 20 parts by weight, preferably 0.1 to 5 parts by weight, per 100 parts by weight of the unsaturated rubber.

The acid catalyst used in the preparation of the modified rubber in the present invention is selected from protonic acids such as sulfuric acid, nitric acid, chlorosulfonic acid, p-toluenesulfonic acid and hydrohalic acids and usually known Lewis acids. Typical examples of the Lewis acids are halides of metals or semi-metals, for example halogen compounds or organic halogen compounds of elements such as Be, B, Al, Si, P, S, Ti, V, Fe, Zn, Ga, Ge, As, Se, Zr, Nb, Mo, Cd, Sn, Sb, Te, Ta, W, Hg, Bi and U or oxygen-element combinations such as PO, SeO, SO, $SO_2$ or VO, and complexes of these. Preferred acid catalysts are those which form a coordination bond with the organic compounds having a carboxyl and an aldehyde group. Especially preferred are those acid catalysts whose coordination products with the organic compounds have an orange color (absorption wavelength 480 nm) or a deeper color. Specific examples include $BF_3$, $(CH_3)_2BF$, $BCl_3$, $AlCl_3$, $AlBr_3$, $(C_2H_5)AlCl_2$, $POCl_3$, $TiCl_4$, $VCl_4$, $MoCl_5$, $SnCl_4$, $(CH_3)SnCl_3$, $SbCl_5$, $TeCl_4$, $TeBr_4$ and $WCl_6$. Of these, $SnCl_4$, $BCl_3$, $WCl_6$ and $SbCl_5$ are especially suitable because they lead to a high rate of reaction and cause little side-reactions such as the gellation of the rubber. It is of course possible to use two or more species of each of the protonic acid and the Lewis acid, or to use the protonic acid in combination with the Lewis acid.

There is no particular restriction on the amount of the acid catalyst used. Usually, it is 0.01 to 5 moles, preferably 0.05 to 2 moles, per mole of the organic compound having a carboxyl and an aldehyde group.

The reaction in this invention is carried out usually in the presence of a suitable solvent, or in a rubber kneading machine in the absence of a solvent. Industrially, the reaction is advantageously carried out in the rubber cement after the end of the polymerization. The solvent may, for example, be an aromatic solvent such as benzene or toluene, a paraffinic solvent such as butane or hexane, or a halogenated hydrocarbon solvent such as chloroform or dichloroethane. Suitable solvents are those which are inert to the acid catalyst, etc. and dissolve the rubber. Solvents which have some degree of solubilizing power for the organic compound having a carboxyl and an aldehyde group or the acid catalyst are especially suitable from the viewpoint of the rate of reaction, etc., but useful solvents are not limited to these particular solvents alone.

The organic compound having a carboxyl and an aldehyde group and the acid catalyst may be separately added to the reaction system, or after they are mixed in advance (in which case a chemical change may occur). All of the acid catalyst may be added in the initial stage of the reaction, or it may be added portionwise or continuously during the reaction.

When the reaction is carried out using a Lewis acid as a catalyst, the reaction system is preferably kept in an anhydrous condition or at a limited water content in order to maintain the activity of the catalyst and to prevent side-reactions such as excessive gellation or cyclization of the rubber. Furthermore, the presence of oxygen is usually not preferred.

The reaction temperature is not particularly restricted. Usually, it is −20° C. to 200° C., preferably 0° C. to 100° C. The reaction time is suitably prescribed between 10 seconds and 50 hours.

When the reaction is carried out in the solvent, the addition of, for example, a large amount of alcohol or hot water can lead to the stopping of the reaction and the coagulation of the rubber. As required, the remaining acid catalyst and other materials are removed by washing, and the residue is dried to give a modified rubber.

An unvulcanized compound obtained by mixing the resulting modified rubber with ordinary rubber compounding agents such as vulcanizing agents, vulcanization accelerators, vulcanization aids, reinforcing agents and softening agents has an excellent green strength, and therefore very good processability. Since a vulcanizate of this compound has excellent strength properties and rebound, it can be used not only in general applications, but also in applications which require these properties, for example as tire carcasses and treads, and antivibration rubber. It is also possible to convert the modified rubber to a latex and use it in usual applications of latices.

The aforesaid properties of the modified rubber in accordance with this invention is presumably because the organic compound having a carboxyl and an aldehyde group adds to the unsaturated linkage portion of the rubber through one or both of these groups. The modified rubber in accordance this invention may be subjected to sulfurless vulcanization with metal oxides, diamines, etc. through these groups introduced into the rubber chains.

The following examples illustrate the present invention more specifically. In these examples, the following methods were used in analyzing modified rubbers, preparing unvulcanized compounds of the modified rubbers and their vulcanizates, and testing their properties.

Amount of the organic compound having a carboxyl and an aldehyde group (to be sometimes referred to simply as the organic compound hereinafter) introduced into rubber Determined by utilizing the absorption at a wavelength of 275 nm of the aromatic ring of the organic compound added to rubber molecules with a gel-permeation chromatographic device equipped with an ultraviolet absorption spectral detector.

Amount of the carboxyl group introduced into rubber

Low-molecular components are removed from the rubber, and then the amount of the carboxyl group introduced into the rubber is measured by the neutralization titration method.

Preparation of an unvulcanized rubber compound

A modified rubber is kneaded with various compounding ingredients in the recipe shown below excepting sulfur and the vulcanization accelerator. The resulting mixture is kneaded with sulfur and the vulcanization accelerator on a small-sized roll mill to prepare an unvulcanized rubber compound.

| Compounding recipe (parts by weight) | |
|---|---|
| Rubber | 100 |
| HAF carbon | 50 |
| Aromatic oil | 5 |
| Zinc oxide | 5 |
| Stearic acid | 2 |
| Sulfur | 2.5 |
| N—oxydiethylene-2-benzothiazyl sulfenamide (vulcanization accelerator) | 0.8 |
| N—isopropyl-N—*phenyl* p-phenylenediamine | 1.0 |

Wallace plasticity

Measured at 100° C. by the Wallace's rapid plastometer.

Green strength

An unvulcanized rubber compound is pressformed at 100° C. for 5 minutes to produce a 2 mm-thick unvulcanized rubber sheet. A dumbbell-shaped specimen (according to JIS No. 3) is punched out, and subjected to a tensile test at a temperature of 25° C. and a tensile speed of 500 mm/min. The tensile stress at 500% stretch is measured.

Vulcanization speed

The time ($T_{95}$) which elapses until the torque measured at 145°, 150° or 165° C. by an oscillating disc rheometer reaches 95% of the maximum torque is measured.

Tensile test

A 2 mm-thick sheet is obtained by pressing and vulcanizing an unvulcanized rubber compound at 145° C. for a predetermined period of time. A dumbbell-shaped No. 3 test specimen stipulated in JIS-K 6301 is punched out from the sheet and subjected to a tensile test at a temperature of 25° C. and a tensile speed of 500 mm/min.

Tear strength

A rectangular test specimen, 15 mm wide and 100 mm long, is punched out from a 2 mm-thick vulcanized rubber sheet, and a 6 mm cut is provided at the center of one side edge in the longitudinal direction at right angles to the side edge by means of a safety razor blade. This specimen is tested for tear strength at 25° C. and a tensile speed of 500 mm/min. Three such test specimens are taken from the rubber sheet in the longitudinal direction thereof, and another three in a direction at right angles to the longitudinal direction, and an average of the measured values of the six specimens is calculated.

Rebound

Measured at 25° C. by using a Dunlop Tripso Meter.

Flexing test

In accordance with JIS K-6301, the number of bending cycles on a specimen which are performed until a crack formed on the specimen grows to a length of 12.5 mm is measured using a de Mattia flexing tester.

EXAMPLE 1

160 g of polyisoprene rubber (cis-1,4 linkage content 98%) was dissolved in 3 liters of dehydrated toluene, and in a sealed glass vessel (separable flask), each of the organic compounds indicated in Table 1 was added in an atmosphere of nitrogen with stirring at 25° C. Subsequently, $SnCl_4$ in the amount indicated in Table 1 was diluted with 40 times its volume of dehydrated benzene, and added dropwise gradually. The color of the solution at this time was observed. The solution was further stirred for each of the reaction times shown in Table 1, and then 500 ml of methanol was poured into it (whereby, it is presumed, the addition reaction ceased). The resulting rubber solution in a semicoagulated condition was poured into 3 liters of methanol to coagulate the rubber completely. The coagulated product was then attenuated and washed. The coagulated fragments were dipped in 3 liters of methanol containing about 2 g of 2,6-di-tertiary butyl-4-methylphenol as an antioxidant, washed, and dried for a day and night in a vacuum dryer.

In this manner, the modified polyisoprene rubber samples A, B, C, D, E, F and G shown in Table 1 were obtained.

TABLE 1

| Samples | Organic compound (g) | $SnCl_4$ (g) | Reaction time (minutes) | Amount introduced into rubber (moles/100g of rubber) Organic compound | Carboxyl group | Color of the solution |
|---|---|---|---|---|---|---|
| A(*) | None | 0.23 | 5 | — | — | Colorless |
| B | 2-Formylphenoxy-acetic acid (3.4) | 2.3 | 4 | 0.0029 | 0.0025 | Reddish violet |
| C | 2-Formylphenoxy-acetic acid (1.7) | 2.3 | 2 | 0.016 | 0.0011 | Red |
| D | 2-Formylphenoxy-acetic acid (3.4) | 0.23 | 5 | 0.0018 | 0.0015 | Red |
| E(*) | Benzoic acid (3.4) | 0.23 | 5 | below 0.0002 | below 0.0002 | Pale yellow |
| F(*) | Benzaldehyde (3.4) | 0.23 | 5 | below 0.002 | — | Pale yellow |
| G(*) | Phthalic acid (4.6) | 0.23 | 5 | below 0.0002 | below 0.0002 | Pale yellow |

(*)Comparative samples

The properties of unvulcanized compounds and vulcanizates of the samples shown in Table 1 were measured, and the results are shown in Table 2.

TABLE 2

| Sample | Properties of the unvulcanized composition | | | Vulcanization time (145° C.) (min.) | Properties of the vulcanizate | | | | |
|---|---|---|---|---|---|---|---|---|---|
| | Wallace plasticity | Green strength (kg/cm²) | Vulcanization speed T₉₅ (145° C.) (min.) | | Tensile test | | | Tear strength (kg/cm) | Rebound (%) |
| | | | | | 300% Tensile stress (kg/cm²) | Tensile strength (kg/cm²) | Elongation (%) | | |
| Polyisoprene rubber (unmodified) | 47.5 | 1.9 | 19 | 24 | 140 | 276 | 520 | 35 | 63 |
| A | 47.0 | 1.9 | 20 | 25 | 148 | 281 | 510 | 35 | 64 |
| B | 43.0 | 64.4 | 21 | 26 | 175 | 270 | 460 | 51 | 74 |
| C | 47.5 | 45.3 | 17 | 22 | 160 | 294 | 490 | 48 | 72 |
| D | 53.0 | 31.9 | 21 | 26 | 172 | 297 | 470 | 47 | 72 |
| E | 45.5 | 2.0 | 21 | 26 | 142 | 273 | 510 | 36 | 66 |
| F | 48.0 | 2.1 | 21 | 26 | 144 | 282 | 520 | 34 | 65 |
| G | 47.5 | 2.0 | 20 | 25 | 141 | 275 | 520 | 35 | 64 |

It is seen from Table 2 that the samples B, C and D in accordance with this invention have especially high green strength, tear strength and rebound.

EXAMPLE 2

One gram of each of the rubbers indicated in Table 3 was dissolved in 25 ml of dehydrated benzene, and in an Erlenmeyer flask, 2-formylphenoxyacetic acid in each of the amounts indicated in Table 3 was added to the solution at 25° C. with stirring by a magnetic stirrer in an atmosphere of nitrogen. Subsequently, SnCl₄ in each of the amounts indicated in Table 3 was diluted with 40 times its volume of dehydrated benzene, and added dropwise. Furthermore, the mixture was stirred

| | | | | |
|---|---|---|---|---|
| Butadiene/piperylene (*1) (70/30) copolymer rubber | 0.028 | 0.040 | 0.5 | 0.0013 |
| Ethylene-propylene ethylidenenorbonene copolymer rubber | 0.011 | 0.008 | 0.5 | 0.0036 |
| Butadiene/isoprene (75/25) copolymer rubber (*2) | 0.011 | 0.008 | 0.5 | 0.0019 |

(*1): Prepared by using a vanadium-containing catalyst.
(*2): Prepared by using a lithium-containing catalyst.

70%)

EXAMPLE 3

Modified polyisoprene rubber samples H, I, J, K, L and M shown in Table 4 were obtained by carrying out the same reaction as in Example 1 except that each of the organic compounds and each of the acid catalysts indicated in Table 4 were used instead of those used in Example 1.

TABLE 4

| Sample | Organic compound (g) | Acid catalyst (g) | Reaction time (minutes) | Amount introduced into rubber (moles/100g of rubber) | |
|---|---|---|---|---|---|
| | | | | Organic compound | Carboxyl group |
| H | 2-Formylphenoxyacetic acid (1.7) | SbCl₅ (1.4) | 20 | 0.0014 | 0.0009 |
| I | 2-(2-Formylphenoxy)-propionic acid (1.8) | SnCl₄ (1.2) | 15 | 0.0022 | 0.0015 |
| J | 3-(2-Formylphenoxy)-propionic acid (1.8) | SbCl₅ (1.4) | 20 | 0.0019 | 0.0013 |
| K | (1-Formyl-2-naphthyl-oxy)acetic acid (2.2) | SnCl₄ (1.2) | 15 | 0.0012 | 0.0007 |

TABLE 4-continued

| Sample | Organic compound (g) | Acid catalyst (g) | Reaction time (minutes) | Amount introduced into rubber (moles/100g of rubber) | |
|---|---|---|---|---|---|
| | | | | Organic compound | Carboxyl group |
| L | 2-Carboxybenzaldehyde (1.4) | BCl₃ (0.55) | 60 | 0.0015 | 0.0006 |
| M | 2-Formylphenoxyacetic acid (1.7) | WCl₆ (1.9) | 60 | 0.0012 | 0.0005 |

The properties of the above samples were measured in the same way as in Example 1, and the results are shown in Table 5. The results show that the samples in accordance with this invention have especially high green strength and tear strength.

TABLE 5

| | Properties of the unvulcanized composition | | | Properties of the vulcanizate | | | |
|---|---|---|---|---|---|---|---|
| Sample | Wallace plasticity | Green strength (kg/cm²) | Vulcanization speed T₉₅ (145° C.) (min.) | Vulcanization time (145° C.) (min.) | 300% Tensile stress (kg/cm²) | Tensile strength (kg/cm²) | Elongation (%) | Tear strength (kg/cm) |
| H | 43 | 41.0 | 17.8 | 23 | 152 | 291 | 510 | 45 |
| I | 49.5 | 52.3 | 19.7 | 25 | 176 | 270 | 460 | 50 |
| J | 45.5 | 48.0 | 19.5 | 25 | 160 | 285 | 480 | 42 |
| K | 50 | 33.2 | 18.3 | 24 | 165 | 287 | 490 | 44 |
| L | 48 | 8.6 | 18.5 | 24 | 147 | 279 | 510 | 42 |
| M | 47.5 | 13.8 | 20.3 | 26 | 149 | 271 | 500 | 41 |

EXAMPLE 4

Example 2 was repeated except that polyisoprene rubber having a cis-1,4 linkage content of 98% was reacted for each of the reaction times shown in Table 6 using each of the organic compounds and each of the acid catalysts shown in Table 6. The modified rubbers shown in Table 6 were obtained.

TABLE 6

| Organic compound (g) | Acid catalyst (g) | Reaction time (hours) | Amount of the organic compound introduced into the rubber (moles/100g of rubber) |
|---|---|---|---|
| 2-Formylphenoxyacetic acid (0.011) | TeCl₄ (0.008) | 0.5 | 0.0010 |
| 2-Formylphenoxyacetic acid (0.011) | H₂SO₄ (0.003) | 0.5 | 0.0006 |
| 3-(2-Formylphenoxy)-propionic acid (0.011) | SnCl₄ (0.008) | 0.5 | 0.0021 |
| 3-(2-Formylphenyl)-propionic acid (0.011) | SnCl₄ (0.008) | 0.5 | 0.0009 |
| 2-Formylphenylthioacetic acid (0.012) | SnCl₄ (0.008) | 0.5 | 0.0019 |
| 2-Carboxyphenoxyacetaldehyde (0.011) | SnCl₄ (0.008) | 0.5 | 0.0009 |
| 3-(Carboxymethoxy)-propionaldehyde (0.008) | SnCl₄ (0.008) | 0.5 | 0.0005 (*) |
| 6-(2-Formylphenoxy)-hexanoic acid (0.014) | SbCl₅ (0.009) | 0.5 | 0.0012 |
| 6-(2-Formylphenoxy)-hexanoic acid (0.014) | WCl₆ (0.012) | 1.0 | 0.0005 |
| 2-Carboxybenzaldehyde (0.009) | WCl₆ (0.012) | 1.0 | 0.0007 |
| 2-Formylphenoxyacetic acid (0.011) | AlBr₃ (0.008) | 1.0 | 0.0008 |
| 2-Formylphenoxyacetic acid (0.011) | VCl₄ (0.006) | 0.5 | 0.0006 |

(*): Amount of the carboxyl group introduced into the rubber.

EXAMPLE 5

The modified rubber samples N, O and P shown in Table 7 were obtained in the same way as in Example 1 except that the rubbers, organic compounds and acid catalysts shown in Table 7 were used and the reaction was carried out for the time periods indicated in Table 7.

TABLE 7

| Sample | Rubber | Organic compound (g) | Acid catalyst (g) | Reaction time (hours) | Amount introduced into rubber (moles/100 g of rubber) | |
|---|---|---|---|---|---|---|
| | | | | | Organic compound | Carboxyl group |
| N | Polybutadiene rubber (cis-1,4 linkage content 98%) | 2-Formylphenoxyacetic acid (4.5) | SnCl₄ (3.2) | 24 | 0.0014 | 0.0009 |
| O | Butadiene/isoprene (50/50) copolymer rubber (*) | 2-Formylphenoxyacetic acid (2.9) | SnCl₄ (4.2) | 0.5 | 0.0025 | 0.0015 |
| P | Butadiene/isoprene (90/10) copolymer | 2-Formylphenoxy- | SnCl₄ (4.2) | 0.5 | 0.0014 | 0.0008 |

TABLE 7-continued

| Sample | Rubber | Organic compound (g) | Acid catalyst (g) | Reaction time (hours) | Amount introduced into rubber (moles/100 g of rubber) | |
|---|---|---|---|---|---|---|
| | | | | | Organic compound | Carboxyl group |
| | rubber (*) | acetic acid (2.9) | | | | |

(*): Prepared by using a lithium-containing catalyst.

The properties of the above samples and the corresponding unmodified rubbers were tested in the same way as in Example 1 except that the compounding recipe (parts by weight) and the vulcanization temperature were partly changed as shown below. The results are shown in Table 8.

Sample N and the corresponding unmodified rubber:
Zinc oxide: 3
Sulfur: 1.5
Vulcanization accelerator: 1.1
Sample O and the corresponding unmodified rubber:
Zinc oxide: 3
Sulfur: 1.7
Vulcanization accelerator: 1.4
Vulcanization temperature: 160° C.
Sample P and the corresponding unmodified rubber:
Zinc oxide: 3
Sulfur: 1.14
Vulcanization accelerator: 1.8
Vulcanization temperature: 160° C.

completely. The coagulated mass was attenuated and washed. The coagulated fragments were dipped in 3 liters of methanol containing about 2 g of 2,6-ditertiary-butyl-4-methylphenol as an antioxidant, washed, and dried for a day and night in a vacuum dryer to give a modified polyisoprene rubber (sample Q).

An infrared absorption spectrum of the purified sample Q was taken, and by comparing its absorbance at 1706 cm$^{-1}$ (C=O) with that at 1660 cm$^{-1}$ (C=O), the amount of the carboxyl group introduced was found to be 0.0013 mole/100 g of rubber.

The properties of an unvulcanized compound and a vulcanizate prepared in accordance with the same compounding recipe as in Example 1 were measured. The results are shown in Table 9.

TABLE 9

| Properties of the unvulcanized compound | |
|---|---|
| Wallace plasticity | 41.5 |
| Green strength (kg/cm$^2$) | 10.3 |
| Vulcanization speed at 145° C., | 19 |
| T$_{95}$ (minutes) | |
| Vulcanization time (minutes) at 145° C. | 24 |
| Properties of the vulcanized product | |
| 300% Tensile stress (kg/cm$^2$) | 150 |
| Tensile strength (kg/cm$^2$) | 272 |
| Elongation (%) | 500 |
| Tear strength (kg/cm) | 44 |
| Rebound (%) | 65 |

TABLE 8

| Sample | Properties of the unvulcanized compound | | | | Properties of the vulcanizate | | | |
|---|---|---|---|---|---|---|---|---|
| | | | | | Tensile test | | | |
| | Mooney viscosity (ML$_{1+4}$, 100° C.) | Green strength (kg/cm$^2$) | Vulcanization speed T$_{95}$ (min.) | Vulcanization time (min.) | 300% tensile stress (kg/cm$^2$) | Tensile strength (kg/cm$^2$) | Elongation (%) | Tear strength (kg/cm) |
| Polybutadiene rubber (cis-1,4 linkage content 98%) | 67 | 2.1 | 25.8 | 35 | 82 | 170 | 510 | 27 |
| N | 70 | 7.4 | 24.3 | 33 | 96 | 181 | 480 | 30 |
| Butadiene-isoprene (50:50) copolymer rubber | 65.5 | 2.0 | 22.9 | 35 | 163 | 187 | 350 | 31 |
| O | 68 | 10.5 | 23.5 | 35 | 178 | 211 | 380 | 36 |
| Butadiene-isoprene (90:10) copolymer rubber | 60 | 1.9 | 27.9 | 35 | 140 | 177 | 360 | 28 |
| P | 65.5 | 2.8 | 24.7 | 35 | 156 | 196 | 380 | 31 |

It is seen from Table 8 that the modified rubbers obtained by this invention have higher green strength, 300% tensile stress, tensile strength and tear strength than the corresponding unmodified rubbers.

EXAMPLE 6

1.1 g of glyoxylic acid hydrate (OHC-COOH.H$_2$O) was dried and dehydrated at 50° under reduced pressure (less than 1 mmHg) for 10 hours, and then dissolved in 100 ml of benzene. A small amount of the insoluble portion was removed.

160 g of polyisoprene rubber (cis-1,4 linkage content 98%) was dissolved in 3 liters of dehydrated n-hexane, and in a sealed glass vessel (separable flask), all of the glyoxylic acid solution prepared as above was added in an atmosphere of nitrogen with stirring at 25° C. Subsequently, 1.5 g of SnCl$_4$ as a benzene solution was gradually added dropwise (the solution turned yellow). The solution was further stirred for 2 hours, and then 50 ml of methanol was poured (whereby, it is presumed, the addition reaction ceased). The resulting rubber solution was poured into 3 liters of acetone to coagulate rubber

EXAMPLE 7

Two kilograms of polyisoprene rubber (cis-1,4 linkage content 98%) was dissolved in 40 liters of dehydrated toluene, and 14.4 g of 2-formylphenoxyacetic acid was added to the solution at 25° C. in a sealed stainless steel vessel with stirring at 25° C. in an atmosphere of nitrogen. Subsequently, 20.8 g of SnCl$_4$ was diluted with 40 times its volume of dehydrated benzene, and gradually added dropwise. The mixture was further stirred for 25 minutes, and 1 liter of methanol was poured (whereby, it is presumed, the addition reaction ceased). The resulting rubber solution was poured into 100 liters of methanol to coagulate the rubber completely, and thereafter, the coagulated mass was attenuated and washed. The coagulated fragments were dipped in several divided portions in 10 liters of methanol containing about 20 g of 2,6-di-tertiary butyl-4-methylphenol as an antioxidant, washed, and dried in a vacuum dryer for a day and night to give a modified polyisoprene rubber sample (R).

Rubber compositions were prepared in accordance with the following compounding recipe using the unmodified polyisoprene rubber and the modified rubber (sample R), and the properties of the compositions were tested. The results are shown in Table 10.

| Compounding recipe (parts by weight) | | |
|---|---|---|
| | Recipe 1 | Recipe 2 |
| Rubber | 100 | 100 |
| Zinc oxide | 5 | 5 |
| Stearic acid | 3 | 3 |
| Silica | 45 | — |
| Calcium carbonate | — | 100 |
| Aromatic oil | 5 | 5 |
| Sulfur | 3 | 3 |
| N—oxydiethylene-2-benzothiazyl sulfenamide | 1.15 | 1.15 |
| Tetramethylthiuram disulfide | 0.15 | 0.1 |
| Triethanolamine | 2 | — |

It is seen from Table 10 that the compositions of this invention have better green strength, tensile stress, rebound and resistance to cracking by bending than the comparative compositions.

TABLE 10

| | Compounding recipe | | | |
|---|---|---|---|---|
| | 1 | | 2 | |
| | Comparison | Invention | Comparison | Invention |
| | Rubber | | | |
| Properties | Polyisoprene rubber | Modified polyisoprene rubber (R) | Polyisoprene rubber | Modified polyisoprene rubber (R) |
| Mooney viscosity of the compound (ML$_{1+4}$, 100° C.) | 69.0 | 66.0 | 38.0 | 41.0 |
| Green strength (kg/cm$^2$) | 0.74 | 13.5 | 0.59 | 9.5 |
| Vulcanization speed (150° C.) T$_{95}$ (min.) | 6.7 | 7.5 | 11.7 | 13.0 |
| Vulcanization time (150° C.) (min.) | 8 | 9 | 13 | 14.5 |
| Tensile test | | | | |
| Tensile strength (kg/cm$^2$) | 281 | 270 | 184 | 179 |
| Elongation (%) | 770 | 680 | 700 | 660 |
| 300% Tensile stress (kg/cm$^2$) | 33 | 51 | 19 | 24 |
| Tear strength (%) (*1) (kg/cm) | 46 | 57 | 25 | 32 |
| Rebound (%) (*2) | 64 | 81 | 65 | 75 |
| Flexing test (cycles × 10$^{-3}$) | 8.1 | 16.0 | 15.0 | 21.5 |

(*1): A B-type test specimen according to JIS K-6301.
(*2): JIS K-6301, 25° C.

EXAMPLE 8

Rubber compositions were prepared in accordance with the compounding recipes shown in Table 11 using the same rubbers as in Example 7. The properties of these compositions were tested, and the results are shown in Table 1. It is seen from this table that the composition in accordance with this invention has a high green strength.

TABLE 11

| | | Comparison | Invention |
|---|---|---|---|
| Compounding recipe | Polyisoprene rubber | 100 | — |
| | Modified polyisoprene rubber (R) | — | 100 |
| | Zinc oxide | 3 | 3 |
| | Stearic acid | 1 | 1 |
| | Sulfur | 2.5 | 2.5 |
| | Vulcanization accelerator (*) | 1.2 | 1.2 |
| Properties of the unvulcanized compound | Mooney viscosity of the compound (ML$_{1+4}$, 100° C.) | 31.0 | 37.5 |
| | Green strength (kg/cm$^2$) | 0.85 | 2.97 |
| Vulcanization characteristics | Vulcanization speed (145° C.) T$_{95}$ (minutes) | 21.8 | 25.1 |
| | Vulcanization time (145° C.) (minutes) | 23 | 27 |
| Properties of the vulcanizate | Tensile test | | |
| | Tensile strength (kg/cm$^2$) | 339 | 333 |
| | Elongation (%) | 790 | 770 |
| | 300% Tensile stress (kg/cm$^2$) | 20 | 22 |

What is claimed is:

1. A process for modifying a rubber, which comprises reacting a rubber having an unsaturated carbon linkage with an organic compound having a carboxyl group and an aldehyde group in the presence of an acid catalyst.

2. The process of claim 1 wherein the rubber having an unsaturated carbon linkage is a rubber derived from a diene.

3. The process of claim 1 wherein the rubber having an unsaturated carbon linkage is an isoprene homopolymer rubber or a copolymer rubber of isoprene with another comonomer.

4. The process of claim 1 wherein the organic compound having a carboxyl group and an aldehyde group is an aromatic compound.

5. The process of claim 1 wherein the organic compound having a carboxyl group and an aldehyde group is an organic compound having an aromatic ring in which the carboxyl group or an atomic grouping containing this group and the aldehyde group or an atomic grouping containing this group are located adjacent to each other on the aromatic ring.

6. The process of claim 1 wherein the organic compound having a carboxyl group and an aldehyde group is 2-formylphenoxyacetic acid.

7. The process of claim 1 wherein the organic compound having a carboxyl group and an aldehyde group is an aliphatic compound.

8. The process of claim 1 wherein the organic compound having a carboxyl group and an aldehyde group is an alicyclic compound.

9. The process of claim 1 wherein the acid catalyst is a Lewis acid.

10. The process of claim 1 wherein the acid catalyst is a halide of a metal or semi-metal.

11. The process of claim 1 wherein the acid catalyst is a chloride of tin, boron, tungsten or antimony.

12. The process of claim 1 wherein the organic compound having a carboxyl group and an aldehyde group is used in an amount of 0.01 to 20 parts by weight per 100 parts by weight of the rubber having an unsaturated carbon linkage.

13. The process of claim 1 wherein the acid catalyst is used in an amount of 0.01 to 5 moles per mole of the organic compound having a carboxyl group and an aldehyde group.

14. The process of claim 1 wherein the reaction is carried out in the presence of a solvent.

15. The process of claim 1 wherein the reaction is carried out at a temperature of 0° to 100° C.

* * * * *